(12) United States Patent
Srivastava et al.

(10) Patent No.: US 11,556,320 B2
(45) Date of Patent: Jan. 17, 2023

(54) ELECTRONIC SYSTEM FOR DYNAMIC ANALYSIS AND DETECTION OF TRANSFORMED TRANSIENT DATA IN A DISTRIBUTED SYSTEM NETWORK

(71) Applicant: BANK OF AMERICA CORPORATION, Charlotte, NC (US)

(72) Inventors: Punit Srivastava, Newark, DE (US); Jian James Chen, Hockessin, DE (US); Prashanthi Jambula, Hyderabad (IN); Udaya Kumar Raju Ratnakaram, Telangana (IN); Javeed Syed, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 404 days.

(21) Appl. No.: 16/987,130

(22) Filed: Aug. 6, 2020

(65) Prior Publication Data
US 2022/0043640 A1    Feb. 10, 2022

(51) Int. Cl.
*G06F 8/52*        (2018.01)
*G06F 8/53*        (2018.01)
*G06F 11/00*      (2006.01)

(52) U.S. Cl.
CPC .................. *G06F 8/52* (2013.01); *G06F 8/53* (2013.01); *G06F 11/008* (2013.01)

(58) Field of Classification Search
None
See application file for complete search history.

(56) References Cited

U.S. PATENT DOCUMENTS 6,167,567 A    12/2000  Chiles et al.
7,047,527 B1    5/2006  Lin et al.
(Continued)

OTHER PUBLICATIONS

Marinescu, Paul, Petr Hosek, and Cristian Cadar. "Covrig: A framework for the analysis of code, test, and coverage evolution in real software." Proceedings of the 2014 international symposium on software testing and analysis. 2014. (Year: 2014).*
(Continued)

*Primary Examiner* — Matthew J Brophy
(74) *Attorney, Agent, or Firm* — Moore & Van Allen PLLC; Vaidehi Bachot

(57) ABSTRACT

Embodiments of the invention are directed to systems, methods, and computer program products for dynamic analysis and detection of transformed transient data in a distributed system network. The system is structured for validating, determining and evaluating temporal data transformations associated with technology resource components across iterations of technology applications for maintaining backward compatibility. The system comprises an execution module structured for executing technology resource components in a plurality of testing technology environments concurrently. The system further comprises an analysis module structured for evaluating iterations of a first technology resource component by comparing the transformed first testing output with the transformed second testing output to determine modifications to the first iteration of the first technology resource component in the second iteration of the first technology resource component that succeeds the first iteration.

20 Claims, 4 Drawing Sheets

(56) References Cited

U.S. PATENT DOCUMENTS

| | | | |
|---|---|---|---|
| 7,861,239 B2 | 12/2010 | Mayfield et al. | |
| 7,865,889 B1 | 1/2011 | Bird et al. | |
| 8,640,119 B2 | 1/2014 | Vidal et al. | |
| 8,868,613 B2 | 10/2014 | Piira et al. | |
| 9,235,402 B2 | 1/2016 | Carpenter et al. | |
| 9,710,250 B2 | 7/2017 | Johnson et al. | |
| 9,794,233 B2 | 10/2017 | Grab et al. | |
| 9,838,375 B2 | 12/2017 | Taine et al. | |
| 10,025,927 B1 | 7/2018 | Khalid et al. | |
| 10,069,672 B2* | 9/2018 | Curtis | H04L 43/04 |
| 10,169,206 B2* | 1/2019 | Magre | G06F 11/3692 |
| 10,185,611 B2 | 1/2019 | Hermany et al. | |
| 10,290,035 B2 | 5/2019 | Firman et al. | |
| 10,503,750 B2* | 12/2019 | Curtis | H04L 41/0631 |
| 11,237,951 B1* | 2/2022 | Tatunashvili | G06F 11/3466 |
| 11,461,223 B2* | 10/2022 | Moondhra | G06F 11/3664 |
| 2006/0082467 A1 | 4/2006 | Funk et al. | |
| 2009/0248695 A1 | 10/2009 | Ozzie et al. | |
| 2013/0132582 A1 | 5/2013 | Kim et al. | |
| 2014/0223423 A1 | 8/2014 | Alsina et al. | |
| 2015/0149537 A1 | 5/2015 | Murphey et al. | |
| 2015/0254330 A1* | 9/2015 | Chan | G06F 16/273 707/613 |
| 2016/0006767 A1 | 1/2016 | Lain et al. | |
| 2016/0103675 A1 | 4/2016 | Aabye et al. | |
| 2016/0309280 A1 | 10/2016 | Chen et al. | |
| 2016/0373527 A1 | 12/2016 | Illowsky et al. | |
| 2017/0192879 A1* | 7/2017 | Athinathan | H04L 43/50 |
| 2017/0357498 A1 | 12/2017 | Amiga et al. | |
| 2018/0102936 A1* | 4/2018 | Curtis | H04L 43/04 |
| 2018/0137035 A1* | 5/2018 | Magre | G06F 11/3692 |
| 2018/0336257 A1* | 11/2018 | Curtis | H04L 41/0631 |
| 2019/0069027 A1 | 2/2019 | Anderson et al. | |
| 2020/0004847 A1 | 1/2020 | Bagga et al. | |
| 2020/0210149 A1* | 7/2020 | Caldwell | G06F 11/3604 |
| 2021/0382813 A1* | 12/2021 | Moondhra | G06F 16/125 |
| 2021/0382814 A1* | 12/2021 | Moondhra | G06F 11/3692 |

OTHER PUBLICATIONS

Phetmanee, Surasak, and Taratip Suwannasart. "A tool for impact analysis of test cases based on changes of a web application." Proceedings of the International MultiConference of Engineers and Computer Scientists. vol. 1. 2014. (Year: 2014).*

Mao, Chengying, and Yansheng Lu. "Regression testing for component-based software systems by enhancing change information." 12th Asia-Pacific Software Engineering Conference (APSEC'05). IEEE, 2005. (Year: 2005).*

* cited by examiner

ELECTRONIC SYSTEM FOR DYNAMIC ANALYSIS AND DETECTION OF TRANSFORMED TRANSIENT DATA IN A DISTRIBUTED SYSTEM NETWORK

FIELD OF THE INVENTION

The present invention generally relates to the field of dynamic analysis and detection of transformed transient data in a distributed system network. Embodiments of the invention are configured for validating, determining and evaluating temporal data transformations associated with technology resource components across iterations of technology applications.

BACKGROUND

Distributed network environments provide a variety of user technology resource components applications (e.g., front-end technology applications, client facing technology applications, web services, etc.) to users. However, this requires operative and compatible interaction between back-end technology resource components (e.g., back-end systems) and user technology resource components, because user applications typically require network data can to be transmitted from the back-end technology resource components. Here, the back-end technology resource components may be required to fetch current network data from other entity systems (e.g., third-party systems, vendor applications, etc.), e.g., through web services, Application programming interfaces (APIs), batch processes, etc. However, the technology resource components perpetually undergo transformations or iterations over time (e.g., monthly), e.g., due to production release cycles, for offering enhancements to the features, etc. However, these temporal transformations/iterations of the technology resource components may inherently cause the operative and compatible interaction and data transfers between back-end technology resource components (e.g., back-end systems) and user technology resource components to be redundant, thereby resulting in undesirable critical defects and adverse inevitable backward compatibility issues. For instance, the temporal transformations/iterations of the technology resource components may cause the data retrieval and/or transmission from back-end technology resource components to be incorrect or different, and may require additional data parameters to be fetched back-end technology resource components differently. Accordingly, a need exists for dynamic analysis and detection of transformed transient data in a distributed system network to mitigate the deleterious effects of temporal data transformations associated with technology resource components across iterations of technology applications.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention comprise systems, methods, and computer program products that address these and/or other needs by providing an innovative system, method and computer program product for dynamic analysis and detection of transformed transient data in a distributed system network. The system is structured for validating, determining and evaluating temporal data transformations associated with technology resource components across iterations of technology applications for maintaining backward compatibility. Typically the system comprises: an execution module structured for executing technology resource components in a plurality of testing technology environments concurrently, and an analysis module structured for transforming the outputs of executing technology resource components and determining deployed changes in iterations of the technology resource components. Moreover, the system comprises at least one memory device with computer-readable program code stored thereon; at least one communication device; at least one processing device operatively coupled to the execution module and the analysis module, the at least one memory device and the at least one communication device. Executing the computer-readable code is configured to cause the at least one processing device to: receive, at a request processing module application, one or more technology resource requests associated with analysis of iterations of technology resource components; determine, for a first technology resource request of the one or more technology resource requests, an associated first technology resource component; determine a plurality of system integration testing environments associated with the first technology resource component, wherein the plurality of system integration testing environments comprise (i) a first technology environment associated with a first iteration of the first technology resource component, and (ii) a second technology environment associated with a second iteration of the first technology resource component that succeeds the first iteration; execute, via a parallel processing component application, the first technology resource component, parallelly, in (i) the first technology environment and (ii) the second technology environment such that executing the first technology resource component provides a first testing output at the first technology environment and a second testing output at the technology environment; transform the first testing output associated with executing the first technology resource component in the first technology environment into a first key-value pair structure; transform the second testing output associated with executing the first technology resource component in the second technology environment into a second key-value pair structure; evaluate, via a dynamic evaluation template algorithm module application, iterations of the first technology resource component by comparing the transformed first testing output with the transformed second testing output to determine modifications to the first iteration of the first technology resource component in the second iteration of the first technology resource component that succeeds the first iteration; construct, via an analysis event data generation component application, analysis event data associated with the evaluation of the first iteration and the second iteration of the first technology resource component; and transmit the analysis event data to a technology system associated with implementing the first technology resource component.

In some embodiments, or in combination with any of the previous embodiments, the one or more technology resource request comprise a plurality of technology resource requests. Here, the invention is further configured to: determine, for each of the plurality of technology resource requests, the resource request structure type; wherein the resource request structure type comprises batch process requests, web service requests, technology application requests and request suites; separate one or more first technology resource requests from the plurality of technology resource requests based on determining that the one or more first technology resource requests are associated with a first resource request type; and decouple the one or more first technology resource requests of the first resource request type, such that each of the one or more first technology resource requests can be processed independently from one another at the parallel processing component application.

In some embodiments, or in combination with any of the previous embodiments, the invention is further configured to: authenticate, via a properties file externalization application, each of the one or more technology resource requests; initialize, via a properties file externalization application, each of the one or more technology resource requests, wherein initializing the one or more technology resource requests comprises determining technology attributes associated with each of the one or more technology resource requests, wherein the technology attributes comprise security certificates, entity host data, technology environment data, and/or technology resource component data; and construct, for each of the one or more technology resource requests, a formatted service request comprising technology resource component ID, technology resource component name, technology resource component URL, header parameters, authentication token, technology resource component type and/or session ID, based on initializing the one or more technology resource requests.

In some embodiments, or in combination with any of the previous embodiments, the invention is further configured to: transmit, from the parallel processing component application, the first testing output and the second testing output to a structured template engine application; determine, for each of the first testing output and the second testing output associated with executing the first technology resource component parallelly, in the first technology environment and the second technology environment, an output type; format, each of the first testing output and the second testing output, such that the first testing output and the second testing output comprise output parameters comprising a request ID, technology resource component name, first technology environment data, second technology environment data, output type, technology resource component type and/or session ID; and store, via the structured template engine application, each of the first testing output and the second testing output associated with executing the first technology resource component parallelly, in the first technology environment and the second technology environment, at a structured output database.

In some embodiments, or in combination with any of the previous embodiments, the invention is further configured to: retrieve, via a response evaluation component application, the stored first testing output and the second testing output from the structured output database, wherein retrieving comprises determining a session ID associated with each of the first testing output and the second testing output stored at the structured output database.

In some embodiments, or in combination with any of the previous embodiments, transforming the first testing output into the first key-value pair structure comprises mapping one or more technology elements of the first technology resource component of the first testing output onto one or more first key-value pairs; and transforming the second testing output into the second key-value pair structure comprises mapping one or more technology elements of the first technology resource component of the second testing output onto one or more second key-value pairs.

In some embodiments, or in combination with any of the previous embodiments, determining modifications to the first iteration of the first technology resource component in the second iteration of the first technology resource component that succeeds the first iteration comprises determining (i) addition of new technology elements in the second iteration of the first technology resource component, (ii) removal of one or more technology elements of the first iteration in the second iteration of the first technology resource component, and/or (iii) alteration of one or more technology elements of the first iteration in the second iteration of the first technology resource component.

In some embodiments, or in combination with any of the previous embodiments, evaluating, via the dynamic evaluation template algorithm module application, iterations of the first technology resource component further comprises: identifying a first modification to a first technology element of the first iteration of the first technology resource component in the second iteration of the first technology resource component that succeeds the first iteration; analyzing the transformed first testing output with the transformed second testing output to determine whether the first modification is compatible with the second iteration of the first technology resource component; and in response to determining that the first modification is compatible with the second iteration of the first technology resource component, implementing the second iteration of the first technology resource component.

In some embodiments, or in combination with any of the previous embodiments, evaluating, via the dynamic evaluation template algorithm module application, iterations of the first technology resource component further comprises: identifying a first modification to a first technology element of the first iteration of the first technology resource component in the second iteration of the first technology resource component that succeeds the first iteration; analyzing the transformed first testing output with the transformed second testing output to determine whether the first modification is (i) an error, and/or (ii) incompatible with the second iteration of the first technology resource component; and in response to determining that the first modification is (i) an error, and/or (ii) incompatible with the second iteration of the first technology resource component, blocking implementation of the second iteration of the first technology resource component.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
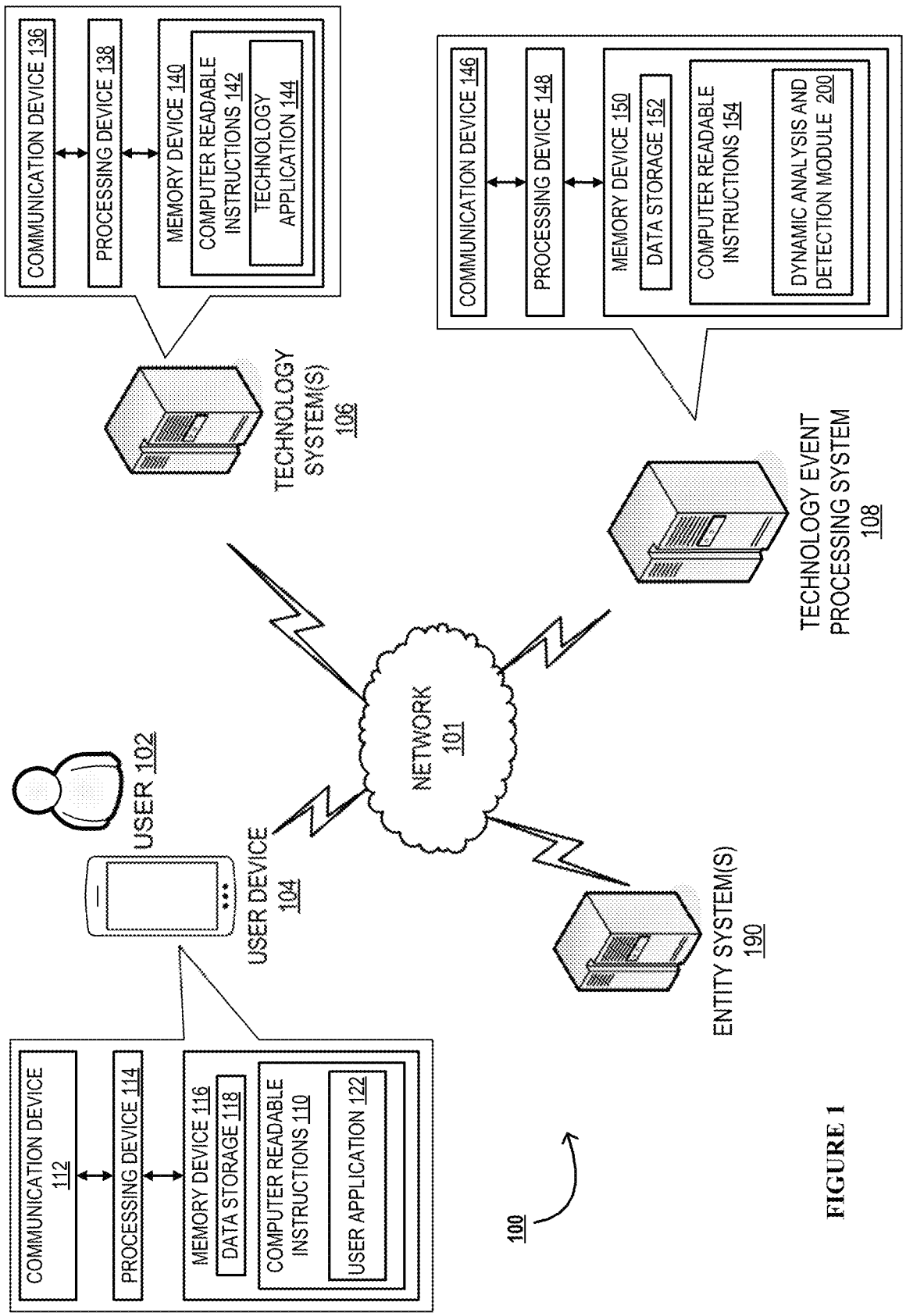
Figure 2:
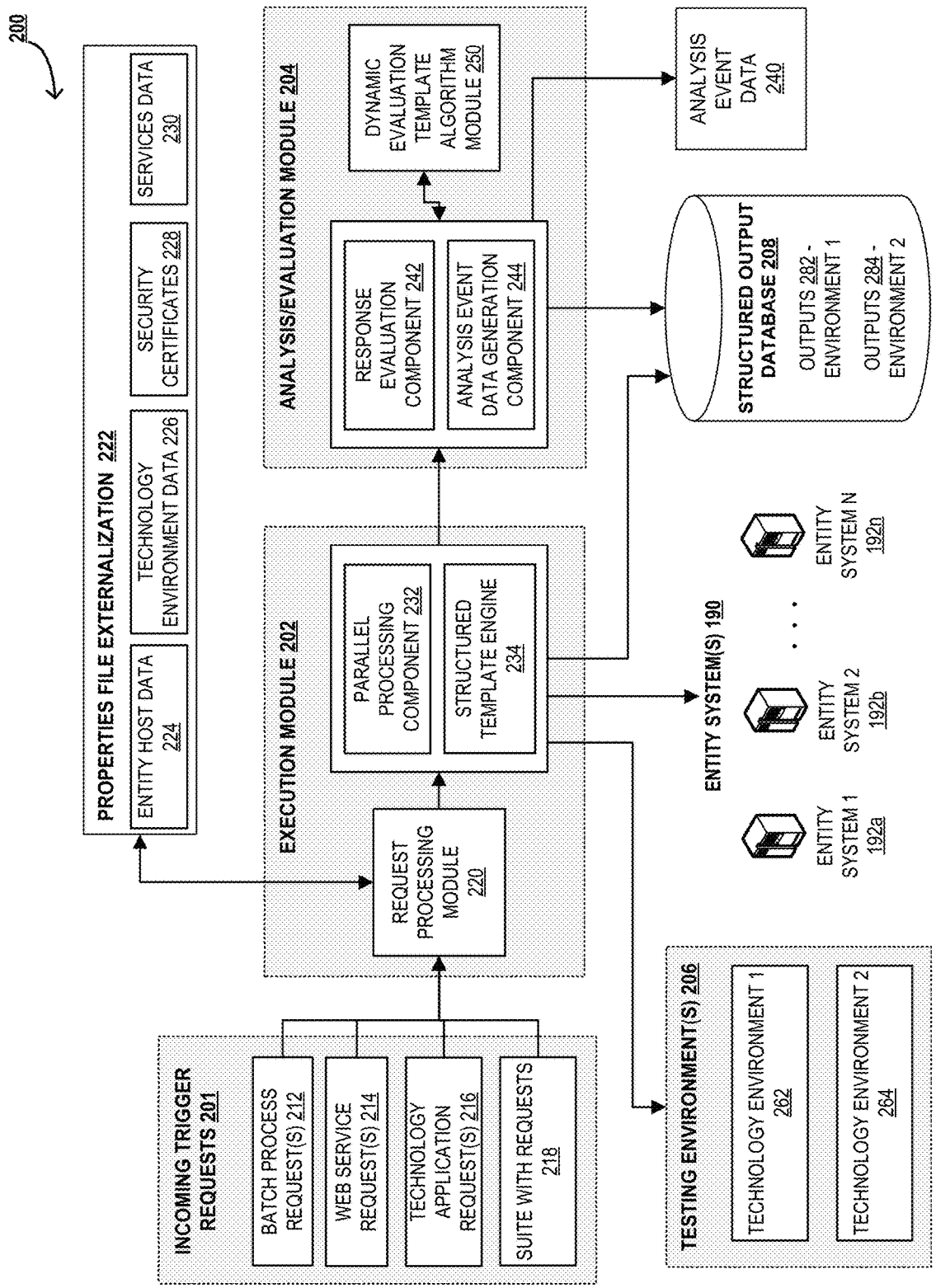
Figure 3:
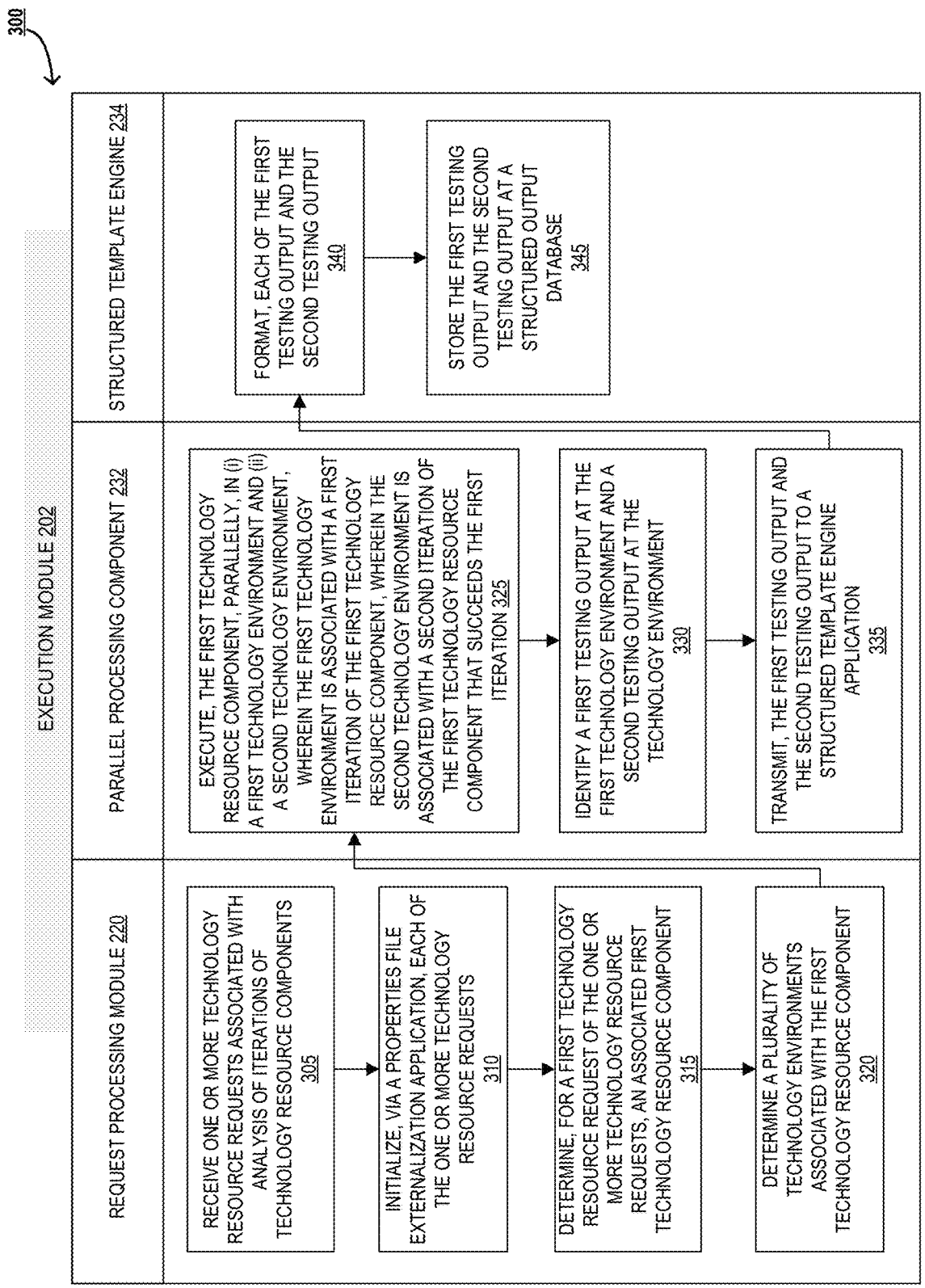
Figure 4:
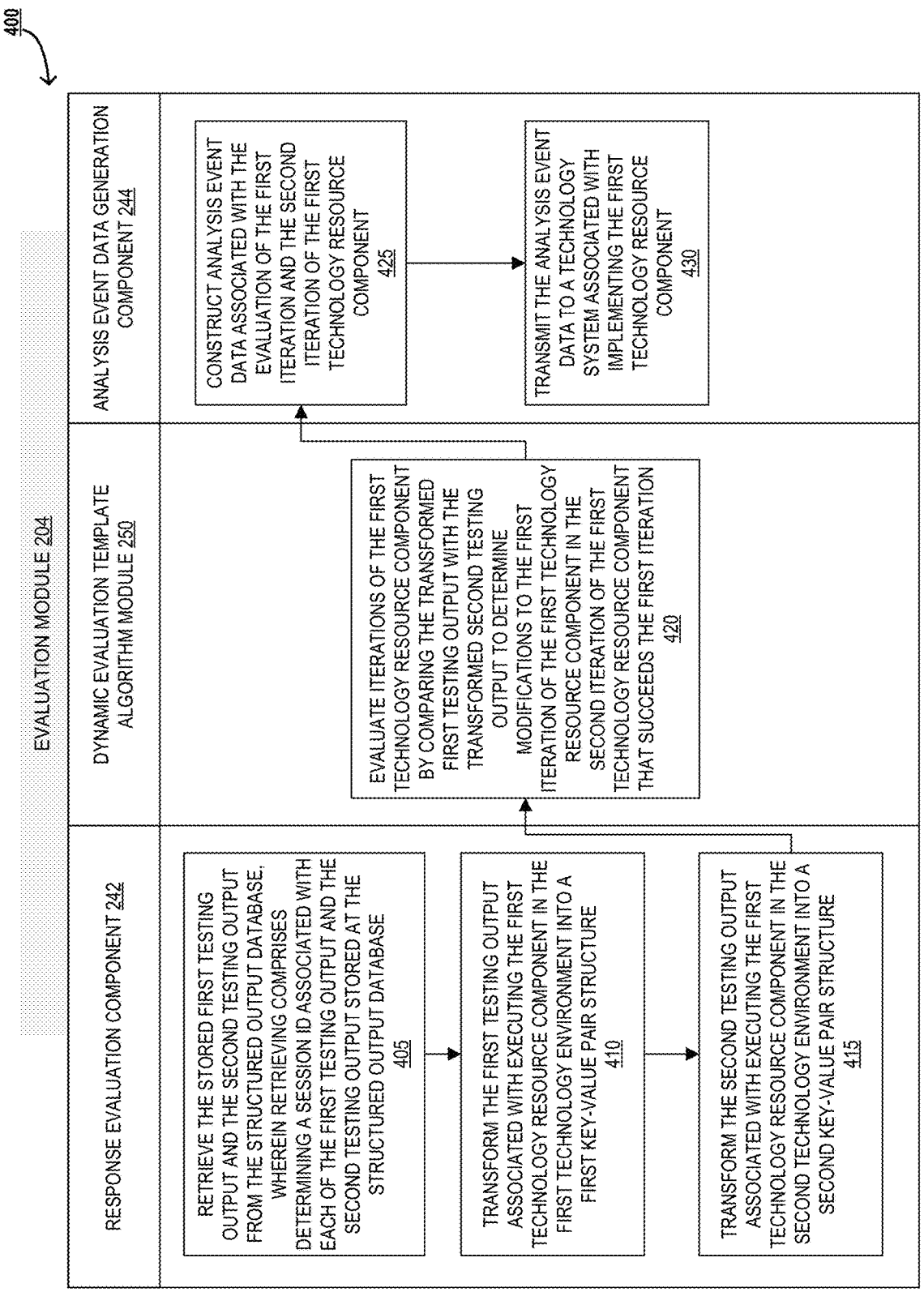

Having thus described embodiments of the invention in general terms, reference will now be made to the accompanying drawings, wherein:

FIG. 1 depicts a distributed system network environment 100 for dynamic analysis and detection of transformed transient data, in accordance with one embodiment of the present invention;

FIG. 2 depicts a schematic dynamic analysis and detection module environment 200, in accordance with one embodiment of the present invention;

FIG. 3 depicts a high-level process flow 300 for dynamic analysis and detection of transformed transient data in a distributed system network, in accordance with one embodiment of the present invention; and FIG. 4 depicts a high-level process flow 400 for dynamic analysis and detection of transformed transient data in a distributed system network, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic technology event data and records, and performing/processing associated technology activities. In some instances, the entity's technology systems comprise multiple technology applications across multiple distributed technology platforms for large scale processing of technology activity files and electronic records. As such, the entity may be any institution, group, association, financial institution, establishment, company, union, authority or the like, employing information technology resources.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein.

In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, or the like. The technology resource is typically associated with and/or maintained by an entity.

As used herein, a "user interface" may be a graphical user interface. Typically, a graphical user interface (GUI) is a type of interface that allows users to interact with electronic devices such as graphical icons and visual indicators such as secondary notation, as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like.

As discussed previously, each "electronic data file" or "technology event data file" or a "data file" often comprises multiple technology event records (for example, hundreds, thousands or tens of thousands of technology event records). Each technology event record may comprise multiple data elements or attributes containing electronic data regarding one or more aspects of an electronic/technology activity. In some instances, each technology event record may comprise technology elements associated with type of activity, instructions for processing the event record, technology resources involved, information associated with the users/entities/systems involved, technology platform applications involved, processing events associated with each technology application, activity attributes, time, location, person/system that initiated/performed the activity, and/or other aspects. Furthermore, the technology elements may by discrete components of the record, or the technology elements may merely refer to one or more portions of a single data component in a record. Although referred to as "a technology event record", it is understood that, in some embodiments each activity may be associated with multiple technology event records.

For example, in the instances where the electronic data files comprise financial information, each electronic data file may comprise multiple technology event records, with each technology event record being associated with an electronic activity comprising a financial activity/transaction. Furthermore, each record may comprise one or more technology elements associated with type of activity (for example, debit, credit, resource transfer), instructions for processing the record (for example, type of processing), technology resources involved (for example, initiating resource/financial institution, receiving resource or financial institution, intermediate resource systems, domestic systems, international systems), technology platforms applications involved (for example, technology data processing applications, regulatory applications, internal applications), information associated with the users/entities/systems involved (for example, initiating or first user name, first user account identifiers, receiving or second user name, second user account identifiers), activity attributes (for example, resource quantity/amount, inbound and outbound currency), timestamp, and/or other aspects.

An electronic activity, also referred to as a technology activity, such as a "resource transfer" or "transaction," may refer to any activities or communication between a user or entity and the financial institution, activities or communication between multiple entities, communication between technology applications and the like. A resource transfer may refer to a payment, processing of funds, purchase of goods or services, a return of goods or services, a payment transaction, a credit transaction, or other interactions involving a user's account. In the context of a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances such as paychecks; loading money onto stored value cards (SVCs) and/or prepaid cards; donating to charities; and/or the like.

Distributed network environments provide a variety of user technology resource components applications (e.g., front-end technology applications, client facing technology applications, web services, etc.) to users. However, this requires operative and compatible interaction between back-end technology resource components (e.g., back-end systems) and user technology resource components, because user applications typically require network data can to be transmitted from the back-end technology resource components. Here, the back-end technology resource components may be required to fetch current network data from other entity systems (e.g., third-party systems, vendor applications, etc.), e.g., through web services, Application programming interfaces (APIs), batch processes, etc. These systems involve high volume data processing requiring multiple back-end applications across various discrete technology platforms running in order to implement the processing stages of electronic data for user technology resource components applications. In some instances, this may involve processing of electronic data across multiple distributed discrete technology platforms that are currently used in the large scale processing of electronic files requires a myriad of processes for data transmission, data reformatting, and substantial transformation of technology activity data stored in the electronic files and records.

However, the technology resource components perpetually undergo transformations or iterations over time (e.g., monthly), e.g., due to production release cycles, for offering enhancements to the features, etc. However, these temporal transformations/iterations of the technology resource components may inherently cause the operative and compatible interaction and data transfers between back-end technology resource components (e.g., back-end systems) and user technology resource components to be redundant, thereby resulting in undesirable critical defects and inevitable backward compatibility issues. For instance, the temporal transformations/iterations of the technology resource components may cause the data retrieval and/or transmission from back-end technology resource components to be incorrect or different, and may require additional data parameters to be fetched back-end technology resource components differently. Typically, this requires the data being transferred between applications to be transformed or re-formatted multiple times as a part of the processing itself or to be conductive for processing by the subsequent technology application and processing platform. This process, however, relies on transient memory locations to store the most current transformed event data after a processing event at a particular technology application. In this regard, the final transformed record data often does not resemble the initial data with respect to the associated format, programing language, syntax and/or attributes.

Hence, determining whether the underlying data in the technology resource components has substantially changed is extremely difficult. As such, data alterations at any of the technology resource components, such as processing errors, may be multiplied/built on by subsequent applications, and may be virtually undetectable until the data record is subsequently rejected or is not able to be processed downstream. Accordingly, there is a need for dynamic analysis and detection of transformed transient data in a distributed system network to mitigate the deleterious effects of temporal data transformations associated with technology resource components across iterations of technology applications. Furthermore, these concerns are exacerbated in applications involving financial transactions, where each electronic file may comprise hundreds, thousands or tens of thousands of records, each record representing an electronic financial transaction, where real-time determination of the status of the transaction processing, content of the modified transaction records at the transient memory location, and determination of the source of any data modifications in the data processing, and subsequent correction for the completion of the financial transaction, is desired. The present invention alleviates the above concerns and is directed to validating, determining and evaluating temporal data transformations associated with technology resource components across iterations of technology applications for maintaining backward compatibility, without increasing the processing time and without modifying platform applications, as will be described in detail in this disclosure.

As discussed previously, embodiments of the present invention alleviate the deficiencies of existing systems and achieve other advantages by providing apparatuses (e.g., a system, computer program product and/or other devices) and methods for dynamic analysis and detection of transformed transient data in a distributed system network. Furthermore, the present invention is structured for validating, determining and evaluating temporal data transformations associated with technology resource components across iterations of technology applications for maintaining backward compatibility.

FIG. 1 illustrates a distributed system network environment 100 for dynamic analysis and detection of transformed transient data, in accordance with one embodiment of the present invention. As illustrated in FIG. 1, a technology event processing system 108 is operatively coupled, via a network 101 to a user device 104, to technology system(s) 106, and to entity system(s) 190. In this way, the technology event processing system 108 can send information to and receive information from the user device 104, the technology system(s) 106 and the entity system(s) 190. FIG. 1 illustrates only one example of an embodiment of the system environment 100, and it will be appreciated that in other embodiments one or more of the systems, devices, or servers may be combined into a single system, device, or server, or be made up of multiple systems, devices, or servers. In this way, the dynamic analysis and detection module 200 of the technology event processing system 108, a network of technology platform applications, is configured for validating, determining and evaluating temporal data transformations associated with technology resource components across iterations of technology applications for maintaining backward compatibility.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 may be one or more individuals accessing user technology resource components applications (e.g., front-end technology applications, client facing technology applications, web services, etc.). As such, in some embodiments, the user 102 may be associated with a financial institution.

FIG. 1 also illustrates a user system 104. The user device 104 may be, for example, a desktop personal computer, a mobile system, such as a cellular phone, smart phone, personal data assistant (PDA), laptop, or the like. The user device 104 generally comprises a communication device 112, a processing device 114, and a memory device 116. The user device 104 is typically a computing system that is configured to enable user and device authentication for access to technology event data. The processing device 114 is operatively coupled to the communication device 112 and the memory device 116. The processing device 114 uses the communication device 112 to communicate with the network 101 and other devices on the network 101, such as, but not limited to, the technology system(s) 106, the technology event processing system 108, etc. As such, the communication device 112 generally comprises a modem, server, or other device for communicating with other devices on the network 101.

The user device 104 comprises computer-readable instructions 110 and data storage 118 stored in the memory device 116, which in one embodiment includes the computer-readable instructions 110 of a user application 122. In some embodiments, the technology event processing system 108 and/or the entity system 106 are configured to cause the processing device 114 to execute the computer readable instructions 110, thereby causing the user device 104 to perform one or more functions described herein, for example, via the user application 122 and the associated user interface.

As further illustrated in FIG. 1, the technology event processing system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device, such as the processing device 148, typically includes functionality to operate one or more software programs and technology platform applications based on computer-readable instructions thereof, which may be stored in a memory device, for example, executing computer readable instructions 154 or computer-readable program code 154 stored in memory device 150 to perform one or more functions associated with a dynamic analysis and detection module 200.

The processing device 148 is operatively coupled to the communication device 146 and the memory device 150. The processing device 148 uses the communication device 146 to communicate with the network 101 and other devices on the network 101, such as, but not limited to the technology system(s) 106, the entity system(s) 190 and the user system 104. As such, the communication device 146 generally comprises a modem, server, or other device for communicating with other devices on the network 101.

As further illustrated in FIG. 1, the technology event processing system 108 comprises the computer-readable instructions 154 stored in the memory device 150, which in one embodiment includes the computer-readable instructions 154 of the dynamic analysis and detection module 200. In some embodiments, the computer readable instructions 154 comprise executable instructions associated with execution module 202, analysis/evaluation module 204, testing environments 206, structured output database 208, and/or their components, associated with the dynamic analysis and detection module 200, wherein these instructions, when executed, are typically configured to cause the applications or modules to perform/execute one or more steps described herein. In some embodiments, the memory device 150 includes data storage 152 for storing data related to the system environment, but not limited to data created and/or used by the dynamic analysis and detection module 200. The dynamic analysis and detection module 200 is further configured to perform or cause other systems and devices to perform the various steps in processing electronic records, as will be described in detail later on.

As such, the processing device 148 is configured to perform some or all of the dynamic analysis and detection steps described throughout this disclosure, for example, by executing the computer readable instructions 154. In this regard, the processing device 148 may perform one or more steps singularly and/or transmit control instructions that are configured to cause the dynamic analysis and detection module 200 (e.g., execution module 202, analysis/evaluation module 204, testing environments 206, structured output database 208, and/or their components), technology system(s) 106, user device 104, and entity system(s) 190 and/or other systems and applications, to perform one or more steps described throughout this disclosure. Although various data processing steps may be described as being performed by execution module 202, analysis/evaluation module 204, testing environments 206, structured output database 208, and/or their components and the like in some instances herein, it is understood that the processing device 148 is configured to establish operative communication channels with and/or between these modules and applications, and transmit control instructions to them, via the established channels, to cause these module and applications to perform these steps.

Embodiments of the technology event processing system 108 may include multiple systems, servers, computers or the like maintained by one or many entities. FIG. 1 merely illustrates one of those systems 108 that, typically, interacts with many other similar systems to form the distributed information network. In one embodiment of the invention, the technology event processing system 108 is operated by the entity associated with the technology system(s) 106 such as a financial institution, while in another embodiment it is operated by a second entity that is a different or separate entity from the technology system(s) 106. In some embodiments, the technology system(s) 106 may be part of the technology event processing system 108. Similarly, in some embodiments, the technology event processing system 108 is part of the technology system(s) 106. In other embodiments, the technology system(s) 106 are distinct from the technology event processing system 108.

In one embodiment of the technology event processing system 108, the memory device 150 stores, but is not limited to, the dynamic analysis and detection module 200 comprising execution module 202, analysis/evaluation module 204, testing environments 206, structured output database 208, and/or their components, as will be described later on with respect to FIG. 2. In one embodiment of the invention, the dynamic analysis and detection module 200 may have computer-executable program code that instructs the processing device 148 to operate the network communication device 146 to perform certain functions involving the entity system(s) 190, the user device 104 and/or the technology system(s) 106, as described herein. In one embodiment, the computer-executable program code of an application associated with the dynamic analysis and detection module 200 may also instruct the processing device 148 to perform certain logic, data processing, and data storing functions of the application. The processing device 148 is configured to use the communication device 146 to receive data, transmit processed data and the like.

In the embodiment illustrated in FIG. 1 and described throughout much of this specification, the dynamic analysis and detection module 200 may perform one or more of the functions described herein, by the processing device 148 executing computer readable instructions 154 and/or executing computer readable instructions associated with one or more technology platform applications.

As illustrated in FIG. 1, the technology system(s) 106 is connected to the technology event processing system 108 and may be associated with a financial institution network. In this way, while only one technology system(s) 106 is illustrated in FIG. 1, it is understood that multiple network systems may make up the system environment 100 and be connected to the network 101. The technology system(s) 106 generally comprises a communication device 136, a processing device 138, and a memory device 140. The technology system(s) 106 comprises computer-readable instructions 142 stored in the memory device 140, which in one embodiment includes the computer-readable instructions 142 of a technology application 144. The technology system(s) 106 may communicate with the technology event processing system 108. The technology event processing system 108 may communicate with the technology system(s) 106 via a secure connection generated for secure encrypted communications between the two systems for communicating data for processing across various applications.

As further illustrated in FIG. 1, in some embodiments, the technology event processing system environment 100 further comprises a entity system(s) 190, in operative communication with the technology event processing system 108, the technology system(s) 106, and/or the user device 104. Typically, the entity system(s) 190 comprises a communication device, a processing device and memory device with computer readable instructions. In some instances, the entity system(s) 190 comprises one or more third-party systems, vendor applications, etc. These applications may be operated by the processor executing the computer readable instructions associated with the entity system(s) 190, as described previously. In some instances, the entity system(s) 190 is owned, operated or otherwise associated with third party entities, while in other instances, the entity system(s) 190 is operated by the entity associated with the systems 108 and/or 106. Although a single external entity system(s) 190 is illustrated, it should be understood that, the entity system(s) 190 may represent multiple technology servers or entity systems 192a, 192b, . . . , 192n operating in sequentially or in tandem to perform one or more data processing operations, as illustrated by FIG. 2.

It is understood that the servers, systems, and devices described herein illustrate one embodiment of the invention. It is further understood that one or more of the servers, systems, and devices can be combined in other embodiments and still function in the same or similar way as the embodiments described herein.

As discussed previously, in a distributed environment, technology applications such as client facing applications and business applications interact with many other backend systems to fetch application data for performing numerous processes associated with the technology applications. In a network, a multitude of processes may run on a daily basis in the background. As an example, this application data can be provisioned through web services and in some cases the data can be fetched from entity systems (e.g., vendor systems) through Soap & Rest Web services, open APIs, batch processes, and/or the like. This application data is continually transformed and modernized throughout production release cycles, e.g., due to enhancements or changes provided therein. As an example, for every production release cycle, web services and batch processes undergo multiple enhancements, thereby rendering different parameters and responses of the applications. For instance, new parameters such as new fields may be provided or existing parameters may be modified by these enhancements, or additional parameters may be added which may be required to be fetched from the back-end systems differently. This causes conventional/existing responses from the back end systems to be different, incompatible, and/or irrelevant to the new iteration. As a non-limiting example, a first technology resource component may be a technology application structured for providing a resource transfer functionality (e.g., transfers between two resources, such as a checking account and a savings account). In the first iteration of the first technology resource component certain types of resources may be enabled (e.g., a checking account and a savings account). In the next iteration of the first technology resource component, the associated data may be transformed such that additional types of resources (e.g., trading account) may be added and configured for resource transfers. Accordingly, the number of accounts are different from the earlier release. Moreover, additional parameters/attributes of the first technology resource component may be changed between the iterations. For instance, from the prior iteration/release, an insurance provider entity application may have been changed. There could be multiple ways in which features from prior production release/iteration to current production release/iteration can be changed. These changes could be a web based feature, or it could be a patch that can run on the data, as a non-limiting example.

In other words, the transient application data is perpetually transformed across production release cycles and iterations of the technology applications and technology system environments. Accordingly, it is cumbersome and arduous, if at all possible, to evaluate the transformed transient data from the back end systems and the entity systems (e.g., vendor systems). The dynamic analysis and detection module 200 of the present invention is structured to address the above technical problems and provide other advantages by providing validation of transient transformed application data across iterations of technology applications and technology system environments (e.g., from prior release to current release), preventing defects, and mitigating backward compatibility issues, as will be described below with respect to FIGS. 2-4.

FIG. 2 illustrates a schematic dynamic analysis and detection module environment 200, in accordance with one embodiment of the present invention. In some embodiments, computer readable instructions 154, when executed by the processing device 148 of the technology event processing system 108 (hereinafter referred to as "the system"), are typically configured to cause the modules, applications, and other components of the dynamic analysis and detection module environment 200 to perform one or more functions as described herein. The dynamic analysis and detection module 200 typically comprises an execution module 202 and an analysis/evaluation module 204, comprising a plurality of processing applications and associated transient memory locations as described below. The dynamic analysis and detection module environment 200 is structured for dynamic data retrieval and evaluation. Specifically, the dynamic analysis and detection module environment 200 is structured for dynamic analysis and detection of transformed transient data in a distributed system network. Here, the dynamic analysis and detection module environment 200 is structured for validating, determining and evaluating temporal data transformations associated with technology resource components across iterations of technology applications for maintaining backward compatibility.

As illustrated by FIG. 2, the dynamic analysis and detection module 200 further comprises an execution module 202 having a request processing module application 220, a parallel processing component application 232 and a structured template engine application 234. The request processing module application 220 may receive one or more technology resource requests 201 (also referred to as incoming trigger requests 201) associated with analysis of iterations of technology resource components. In some embodiments, the one or more technology resource requests 201 may comprise a plurality of technology resource requests 201 comprising batch process requests 212, web service requests 214, technology application requests 216 and request suites 218.

As illustrated by FIG. 2, the dynamic analysis and detection module environment 200 comprises (i) an execution module 202 and (ii) an analysis/evaluation module 204. The execution module 202, via the resource processing module 220, is structured to process and analyze incoming trigger requests 201 (e.g., input request/requests/suite of multiple service requests), and in response, trigger the backend calls in parallel to fetch the data for prior iteration/release and the current iteration/release. The incoming trigger requests 201 can be varied based on the technology application requirement and requests can be multiple considering the different features that the application provides. The resource processing module 220 may aggregate the incoming trigger requests 201 based on the request type, such as batch process request type 212, web service request type 214, technology application request type 216 and suite of requests type 218. In some embodiments, the request processing module application 220 may then determine, for each of the plurality of technology resource requests 201, the resource request structure type. The resource request structure type typically comprises batch process requests 212, web service requests 214, technology application requests 216 and request suites 218. The request processing module application 220 may then separate one or more first technology resource requests from the plurality of technology resource requests based on determining that the one or more first technology resource requests are associated with a first resource request type. Here, the request processing module application 220 may decouple the one or more first technology resource requests of the first resource request type, such that each of the one or more first technology resource requests can be processed independently from one another at the parallel processing component application 232. For example, if the incoming trigger requests 201 comprise a first request of the batch process request type 212, a second request of the web service request type 214, a third request of the batch process request type 212, a fourth request of the web service request type 214, and a fifth request of the batch process request type 212 in a particular session, the resource processing module 220 may separate the first, third and fifth requests of the batch process request type 212 and group them, and further separate the second and fourth requests of the web service request type 214 and group them as well. The resource processing module 220 may further demarcate the requests within the groups such that the requests can be processed independently from each other.

In some embodiments, the request processing module application 220 may authenticate each of the one or more technology resource requests 201 via a properties file externalization application 222. Here, the resource processing module 220 may retrieve properties of the requests 201 such as entity host data 224 (e.g., third-party or vendor host information), technology environment details 226, security certificates 228, list or services 230, etc. from the properties file externalization system 222. The resource processing module 220 may validate the entity host data 224 (e.g., third-party or vendor host information), technology environment details 226, security certificates 228, list or services 230, etc. and initialize the requests with them. Here, in some embodiments, the request processing module application 220 may initialize each of the one or more technology resource requests 201. Typically, initializing the one or more technology resource requests comprises determining technology attributes associated with each of the one or more technology resource requests. In some embodiments, the technology attributes comprise one or more of security certificates 228, entity host data 224, technology environment data 226, and/or technology resource component data 230 (also referred to as services data 230). The request processing module application 220 may then construct a formatted service request for each of the one or more technology resource requests 201, based on initializing the one or more technology resource requests. In some embodiments, the formatted service request comprises a technology resource component ID, technology resource component name, technology resource component URL, header parameters, authentication token, technology resource component type and/or session ID.

The resource processing module 220 may identify that certain technology applications are entity 190 (e.g., vendor) based and determine that because the entity (e.g., vendor) network 190 is external to the dynamic analysis and detection module environment 200, operative communication therebetween requires security configurations and SSL handshake. The resource processing module 220 may then invoke the properties file externalization system 222 and identify and validate security certificates 228 for invoking the entity (e.g., vendor) based backend systems, thereby ensuring a security handshake between the dynamic analysis and detection module environment 200 network and the entity (e.g., vendor) network 190. Next, the resource processing module 220 processes the requests 201, validates their authenticity, isolates the requests 201 based on their type such as web service requests 214, batch process requests 212, technology application requests 216, suite with requests 218, and/or the like. The resource processing module 220 may configure/program a request format such that any of the requests types 201 are accepted. The resource processing module 220 may then transmit the requests to the parallel processing component 232.

Next, the parallel processing component 232 executes the received requests from the resource processing module 220 by invoking the relevant technology features/components/applications in the technology environments. As illustrated by FIG. 2, the dynamic analysis and detection module 200 further comprises testing environments 206 such as technology environment-1 262 and technology environment-2 264. The system may determine, for a first technology resource request of the one or more technology resource requests, an associated first technology resource component. The system may further determine a plurality of system integration testing environments 206 associated with the first technology resource component. As illustrated, the plurality of system integration testing environments may comprise (i) a first technology environment 262 associated with a first iteration of the first technology resource component, and (ii) a second technology environment 264 associated with a second iteration of the first technology resource component that succeeds the first iteration. As discussed previously, in a distributed environment, technology infrastructure (e.g., servers) is grouped into different technology environments 206 and regions for implementing the prior iteration/release development changes and current release development changes as the technology applications (e.g., technology resource components) go through frequent upgrades for providing new features to users. For example, technology environment-1 262 may be a SIT 1 environment for the first/previous iteration/release and technology environment-2 264 may be a SIT 1 environment for the second/current iteration/release. The technology environment-1 262 comprises the production code for the first/previous iteration/release, while the technology environment-2 264 comprises production code for the second/current iteration/release. Next, the parallel processing component 232 transmits the requests concurrently to different testing/technology environments 206.

Subsequently, the parallel processing component application 232 may execute the first technology resource component, parallelly, in (i) the first technology environment 262 and (ii) the second technology environment 264. Here, the parallel processing component 232 may further invoke the relevant entity systems 190 to obtain any processing data therefrom. The parallel processing component application 232 may obtain a first testing output at the first technology environment 262 and a second testing output at the second technology environment 264. In other words, upon execution of the requests, the technology environment-1 262 may provide a first output 282 and the technology environment-2 264 may provide a second output 284. The parallel processing component 232 may further separate the outputs/responses 282-284 captured for both first/prior iteration/release from the technology environment-1 262 and the second/current iteration/release from the technology environment-2 264 and transmit them to the structured template engine 234.

The parallel processing component 232 may then transmit the outputs 282-284 to the structured template engine 234. The structured template engine 234 structures and transforms the outputs 282-284 to make them compatible for analysis. For instance, the structured template engine 234 may determine that the first output 282 is in a JSON file format and that the second output 284 is in a HML file format. Here, the structured template engine 234 may normalize the fields of the files, add new fields to indicate the specific file format, add new fields to indicate a session ID, a request ID, associated technology environment, and/or the like. The structured template engine application 234 may determine an output type, for each of the first testing output and the second testing output associated with executing the first technology resource component parallelly, in the first technology environment 262 and the second technology environment 264. The structured template engine application 234 may then format, each of the first testing output and the second testing output, such that the first testing output and the second testing output comprise output parameters comprising a request ID, technology resource component name, first technology environment data, second technology environment data, output type, technology resource component type and/or session ID. Subsequently, the structured template engine application 234 may store each of the formatted and structured first testing output 282 and the second testing output 284 at a structured output database 208. As illustrated by FIG. 2, the dynamic analysis and detection module 200 further comprises a structured output database 208 structured for storing outputs 282 from technology environment-1 262 and outputs 284 from technology environment-2 264.

As illustrated by FIG. 2, the dynamic analysis and detection module 200 further comprises an analysis/evaluation module 204 having a response evaluation component application 242, an analysis event data generation component application 244 and a dynamic evaluation template algorithm module application 250. Subsequently, the analysis/evaluation module 204 retrieves the outputs/responses from the structured output database 208 for two different environments 206 to process and uniquely evaluate the outputs/responses. Here, the response evaluation component 242 retrieves each outputs/response from the pool of stored outputs based on their session ID to identify outputs associated with requests of the same session. The response evaluation component application 242 may then retrieve the stored first testing output 282 and the second testing output 284 from the structured output database 208. Here, the response evaluation component application 242 may determine a session ID associated with each of the first testing output 282 and the second testing output 284 stored at the structured output database 208.

Next, the dynamic evaluation template algorithm module 250 generates a custom/specialized dynamic evaluation template, based on the particular format and attributes of the outputs/responses 282-284. Here, the dynamic evaluation template algorithm module 250 analyzes the structure of the data sets in the two outputs, and tailors the template to the particular structure.

The response evaluation component 242 employs the dynamic evaluation template to evaluate the differences between the first/prior and second/current release/iterations changes deployed onto the distributed environments. Here, the response evaluation component 242, via the dynamic evaluation template, may transform the outputs into key-value pairs. The response evaluation component application 242, via the dynamic evaluation template algorithm module application 250, may transform the first testing output associated with executing the first technology resource component in the first technology environment 262 into a first key-value pair structure. Here, in some embodiments, transforming the first testing output into the first key-value pair structure comprises mapping one or more technology elements of the first technology resource component of the first testing output onto one or more first key-value pairs. Similarly, the response evaluation component application 242, via the dynamic evaluation template algorithm module application 250, may transform the second testing output associated with executing the first technology resource component in the second technology environment 264 into a second key-value pair structure. Here, in some embodiments, transforming the second testing output into the second key-value pair structure comprises mapping one or more technology elements of the first technology resource component of the second testing output onto one or more second key-value pairs. For example, the response evaluation component 242 may determine that the first output 282 is of a JSON format or an XML format. The data in the outputs is represented, formatted or otherwise configured differently based on the type of format. The system transforms this disparate data into Key-value pairs, thereby removing variations, so that they are compatible for comparison and analysis. The response evaluation component 242 may then determine the fields in the first output 282 and construct "key" components based on the determined fields. Next, the response evaluation component 242 may determine the output/result data associated with the field and construct "value" components therefrom. For example, the system may construct a first key-value pair with "current resource quantity" (e.g., account balance) as the first key component and "Quantity 1" (e.g., amount) as the corresponding first value component of the first key-value pair. For example, the system may construct a second key-value pair with "user name" as the second key component and "Name 1" as the corresponding second value component of the second key-value pair.

Next, the dynamic evaluation template algorithm module application 250 may evaluate iterations of the first technology resource component by comparing the transformed first testing output with the transformed second testing output to determine modifications to the first iteration of the first technology resource component in the second iteration of the first technology resource component that succeeds the first iteration. The dynamic evaluation template algorithm module application 250 analyzes the key-value pairs to determine modifications between the iterations. For example, the dynamic evaluation template algorithm module application 250 may determine that the first output 282 comprises 10 key-value pairs associated with a particular feature (e.g., resources such as accounts), while the second output 284 comprises 11 key-value pairs associated with the same particular feature. Accordingly, the dynamic evaluation template algorithm module application 250 may determine that the addition of a new feature in the second iteration. As another example, the dynamic evaluation template algorithm module application 250 may determine that the first output 282 comprises a key-value pair associated with a particular feature with the key value pair being having a key component of "feature 1" and a value component of "Value 1", while the second output 284 comprises a key-value pair associated with the same feature with the key value pair being having a key component of "feature 1" and a value component of "Value 2". Here, the dynamic evaluation template algorithm module application 250 may determine that the 2 outputs have different values for the same key feature, and accordingly determine a change in an existing feature/component/functionality.

Subsequently, the analysis event data generation component application 244 may construct analysis event data 240 associated with the evaluation of the first iteration and the second iteration of the first technology resource component. The analysis event data generation component application 244 may then transmit the analysis event data to a technology system 106 associated with implementing the first technology resource component. The analysis event data generation component 244 constructs the evaluated results as analysis event data 240 and generates a report. The analysis event data 240 may be displayed on a dashboard GUI on the user device for further analysis by users/individuals.

FIG. 3 illustrates a high-level process flow 300 for dynamic analysis and detection of transformed transient data in a distributed system network, in accordance with one embodiment of the present invention. As discussed previously, the request processing module application 220 may receive one or more technology resource requests 201 (also referred to as incoming trigger requests 201) associated with analysis of iterations of technology resource components, as indicated by block 305. In some embodiments, the one or more technology resource requests 201 may comprise a plurality of technology resource requests 201 comprising batch process requests 212, web service requests 214, technology application requests 216 and request suites 218. The execution module 202, via the resource processing module 220, is structured to process and analyze incoming trigger requests 201 (e.g., input request/requests/suite of multiple service requests), and in response, trigger the backend calls in parallel to fetch the data for prior iteration/release and the current iteration/release. The incoming trigger requests 201 can be varied based on the technology application requirement and requests can be multiple considering the different features that the application provides.

In some embodiments, the system, via the request processing module application 220 may then determine, for each of the plurality of technology resource requests 201, the resource request structure type. The resource request structure type typically comprises batch process requests 212, web service requests 214, technology application requests 216 and request suites 218. The request processing module application 220 may then separate one or more first technology resource requests from the plurality of technology resource requests based on determining that the one or more first technology resource requests are associated with a first resource request type. Here, the request processing module application 220 may decouple the one or more first technology resource requests of the first resource request type, such that each of the one or more first technology resource requests can be processed independently from one another at the parallel processing component application 232.

The system, via the resource processing module 220, may aggregate the incoming trigger requests 201 based on the request type, such as batch process request type 212, web service request type 214, technology application request type 216 and suite of requests type 218. For example, if the incoming trigger requests 201 comprise a first request of the batch process request type 212, a second request of the web service request type 214, a third request of the batch process request type 212, a fourth request of the web service request type 214, and a fifth request of the batch process request type 212 in a particular session, the resource processing module 220 may separate the first, third and fifth requests of the batch process request type 212 and group them, and further separate the second and fourth requests of the web service request type 214 and group them as well. The system, via the resource processing module 220, may further demarcate the requests within the groups such that the requests can be processed independently from each other.

As illustrated by block 310, in some embodiments, the request processing module application 220 may initialize each of the one or more technology resource requests 201.

Typically, initializing the one or more technology resource requests comprises determining technology attributes associated with each of the one or more technology resource requests. In some embodiments, the technology attributes comprise one or more of security certificates 228, entity host data 224, technology environment data 226, and/or technology resource component data 230 (also referred to as services data 230). The request processing module application 220 may then construct a formatted service request for each of the one or more technology resource requests 201, based on initializing the one or more technology resource requests. In some embodiments, the formatted service request comprises a technology resource component ID, technology resource component name, technology resource component URL, header parameters, authentication token, technology resource component type and/or session ID. In some embodiments, the request processing module application 220 may authenticate each of the one or more technology resource requests 201 via a properties file externalization application 222.

Here, the system, via the resource processing module 220, may authenticate each of the incoming trigger requests 201 and pre-initialize each of the incoming trigger requests 201. Here, the system, via the resource processing module 220, may retrieve properties of the requests 201 such as entity host data 224 (e.g., third-party or vendor host information), technology environment details 226, security certificates 228, list or services 230, etc. from the properties file externalization system 222. The system, via the resource processing module 220, may validate the entity host data 224 (e.g., third-party or vendor host information), technology environment details 226, security certificates 228, list or services 230, etc. and initialize the requests with them.

Moreover, the system, via the resource processing module 220, may identify that certain technology applications are entity 190 (e.g., vendor) based and determine that because the entity (e.g., vendor) network 190 is external to the dynamic analysis and detection module environment 200, operative communication therebetween requires security configurations and SSL handshake. The system, via the resource processing module 220, may then invoke the properties file externalization system 222 and identify and validate security certificates 228 for invoking the entity (e.g., vendor) based backend systems, thereby ensuring a security handshake between the dynamic analysis and detection module environment 200 network and the entity (e.g., vendor) network 190. Next, the system, via the resource processing module 220, processes the requests 201, validates their authenticity, isolates the requests 201 based on their type such as web service requests 214, batch process requests 212, technology application requests 216, suite with requests 218, and/or the like. The system, via the resource processing module 220, may configure/program a request format such that any of the requests types 201 are accepted. The system, via the resource processing module 220, may then transmit the requests to the parallel processing component 232.

Next at block 315, the system, at the parallel processing component 232, may determine, for a first technology resource request of the one or more technology resource requests, an associated first technology resource component. The first technology resource component may refer to a technology application, GUI feature, web resource, and/or the like associated with the request.

The system may further determine a plurality of system integration testing environments 206 associated with the first technology resource component, as indicated by block 320.

As illustrated, the plurality of system integration testing environments may comprise (i) a first technology environment 262 associated with a first iteration of the first technology resource component, and (ii) a second technology environment 264 associated with a second iteration of the first technology resource component that succeeds the first iteration. As discussed previously, in a distributed environment, technology infrastructure (e.g., servers) is grouped into different technology environments 206 and regions for implementing the prior iteration/release development changes and current release development changes as the technology applications (e.g., technology resource components) go through frequent upgrades for providing new features to users. For example, technology environment-1 262 may be a SIT 1 environment for the first/previous iteration/release and technology environment-2 264 may be a SIT 1 environment for the second/current iteration/release. The technology environment-1 262 comprises the production code for the first/previous iteration/release, while the technology environment-2 264 comprises production code for the second/current iteration/release.

Subsequently, at block 325, the system, via the parallel processing component 232, executes the received requests from the resource processing module 220 by invoking the relevant technology features/components/applications in the technology environments. Next, the system, via the parallel processing component 232, transmits the requests concurrently to different testing/technology environments 206. Here, the parallel processing component application 232 may execute the first technology resource component, parallelly, in (i) the first technology environment 262 and (ii) the second technology environment 264. The parallel processing component application 232 may obtain a first testing output at the first technology environment 262 and a second testing output at the second technology environment 264 at block 330. The parallel processing component application 232 may then transmit the first testing output and the second testing output to a structured template engine application 234, as indicated by block 335. Upon execution of the requests, the technology environment-1 262 may provide a first output 282 and the technology environment-2 264 may provide a second output 284. The system, via the parallel processing component 232, may further separate the outputs/responses 282-284 captured for both first/prior iteration/release from the technology environment-1 262 and the second/current iteration/release from the technology environment-2 264 and transmit them to the structured template engine 234.

The structured template engine application 234 may determine an output type, for each of the first testing output and the second testing output associated with executing the first technology resource component parallelly, in the first technology environment 262 and the second technology environment 264. As indicated by block 340, the structured template engine application 234 may then format, each of the first testing output and the second testing output, such that the first testing output and the second testing output comprise output parameters comprising a request ID, technology resource component name, first technology environment data, second technology environment data, output type, technology resource component type and/or session ID. Here, the system, via the structured template engine 234, structures and transforms the outputs 282-284 to make them compatible for analysis. For instance, the system, via the structured template engine 234, may determine that the first output 282 is in a JSON file format and that the second output 284 is in a HML file format. Here, the system, via the structured template engine 234, may normalize the fields of the files, add new fields to indicate the specific file format, add new fields to indicate a session ID, a request ID, associated technology environment, and/or the like. Next, the system, via the structured template engine 234, structures the outputs/responses and stores them in the structured output database 208. Subsequently, the structured template engine application 234 may store each of the formatted and structured first testing output 282 and the second testing output 284 at a structured output database 208, as indicated by block 345.

FIG. 4 illustrates a high-level process flow 400 for dynamic analysis and detection of transformed transient data in a distributed system network, in accordance with one embodiment of the present invention. Subsequently, the system, via the analysis/evaluation module 204, retrieves the outputs/responses 282-284 from the structured output database 208 for two different environments 206 to process and uniquely evaluate the outputs/responses 282-284. As indicated by block 405, the response evaluation component application 242 may then retrieve the stored first testing output 282 and the second testing output 284 from the structured output database 208. Here, the response evaluation component application 242 may determine a session ID associated with each of the first testing output 282 and the second testing output 284 stored at the structured output database 208. Here, the system, via the response evaluation component 242, retrieves each outputs/response 282-284 from the pool of stored outputs based on their session ID to identify outputs associated with requests of the same session. Next, the system, via the dynamic evaluation template algorithm module 250, generates a custom/specialized dynamic evaluation template, based on the particular format and attributes of the outputs/responses 282-284. Here, the system, via the dynamic evaluation template algorithm module 250, analyzes the structure of the data sets in the two outputs, and tailors the template to the particular structure.

The system, via the response evaluation component 242 employs the dynamic evaluation template to evaluate the differences between the first/prior and second/current release/iterations changes deployed onto the distributed environments. Here, the response evaluation component 242, via the dynamic evaluation template, may transform the outputs into key-value pairs. For example, the response evaluation component 242 may determine that the first output 282 is of a JSON format or an XML format. The data in the outputs is represented, formatted or otherwise configured differently based on the type of format. The system transforms this disparate data into Key-value pairs, thereby removing variations, so that they are compatible for comparison and analysis.

Specifically, as indicated by block 410, the response evaluation component application 242, via the dynamic evaluation template algorithm module application 250, may transform the first testing output associated with executing the first technology resource component in the first technology environment 262 into a first key-value pair structure. Here, in some embodiments, transforming the first testing output into the first key-value pair structure comprises mapping one or more technology elements of the first technology resource component of the first testing output onto one or more first key-value pairs. Similarly, at block 415, the response evaluation component application 242, via the dynamic evaluation template algorithm module application 250, may transform the second testing output associated with executing the first technology resource component in the second technology environment 264 into a second key-value pair structure. Here, in some embodiments, transforming the second testing output into the second key-value pair structure comprises mapping one or more technology elements of the first technology resource component of the second testing output onto one or more second key-value pairs. Here, for mapping, the system, via the response evaluation component 242, may determine the fields in the first output 282 and construct "key" components based on the determined fields. Next, the system, via the response evaluation component 242, may determine the output/result data associated with the field and construct "value" components therefrom. For example, the system may construct a first key-value pair with "current resource quantity" (e.g., account balance) as the first key component and "Quantity 1" (e.g., amount) as the corresponding first value component of the first key-value pair. For example, the system may construct a second key-value pair with "user name" as the second key component and "Name 1" as the corresponding second value component of the second key-value pair.

As indicated by block 420, the dynamic evaluation template algorithm module application 250 may evaluate iterations of the first technology resource component by comparing the transformed first testing output with the transformed second testing output to determine modifications to the first iteration of the first technology resource component in the second iteration of the first technology resource component that succeeds the first iteration. The dynamic evaluation template algorithm module application 250 analyzes the key-value pairs to determine modifications between the iterations. For example, the system, via the dynamic evaluation template algorithm module application 250, may determine that the first output 282 comprises 10 key-value pairs associated with a particular feature (e.g., resources such as accounts), while the second output 284 comprises 11 key-value pairs associated with the same particular feature. Accordingly, the system, via the dynamic evaluation template algorithm module application 250, may determine that the addition of a new feature in the second iteration. As another example, the system, via the dynamic evaluation template algorithm module application 250, may determine that the first output 282 comprises a key-value pair associated with a particular feature with the key value pair being having a key component of "feature 1" and a value component of "Value 1", while the second output 284 comprises a key-value pair associated with the same feature with the key value pair being having a key component of "feature 1" and a value component of "Value 2". Here, the system, via the dynamic evaluation template algorithm module application 250, may determine that the 2 outputs have different values for the same key feature, and accordingly determine a change in an existing feature/component/functionality.

In some embodiments, determining modifications to the first iteration of the first technology resource component in the second iteration of the first technology resource component that succeeds the first iteration comprises determining (i) addition of new technology elements in the second iteration of the first technology resource component, (ii) removal of one or more technology elements of the first iteration in the second iteration of the first technology resource component, and/or (iii) alteration of one or more technology elements of the first iteration in the second iteration of the first technology resource component. For example, the system, via the dynamic evaluation template algorithm module application 250, may determine that the first output 282 comprises 10 key-value pairs associated with a particular feature (e.g., resources such as accounts), while the second output 284 comprises 11 key-value pairs associated with the same particular feature. Accordingly, the system, via the dynamic evaluation template algorithm module application 250, may determine that the addition of a new feature in the second iteration. As another example, the system, via the dynamic evaluation template algorithm module application 250, may determine that the first output 282 comprises a key-value pair associated with a particular feature with the key value pair being having a key component of "feature 1" and a value component of "Value 1", while the second output 284 comprises a key-value pair associated with the same feature with the key value pair being having a key component of "feature 1" and a value component of "Value 2". Here, the system, via the dynamic evaluation template algorithm module application 250, may determine that the 2 outputs have different values for the same key feature, and accordingly determine a change in an existing feature/component/functionality.

In some embodiments, evaluating, via the dynamic evaluation template algorithm module application 250, iterations of the first technology resource component further comprises identifying a first modification to a first technology element of the first iteration of the first technology resource component in the second iteration of the first technology resource component that succeeds the first iteration. Here, the dynamic evaluation template algorithm module application 250 may analyze the transformed first testing output with the transformed second testing output to determine whether the first modification is compatible (e.g., an enhancement) with the second iteration of the first technology resource component. In response to determining that the first modification is compatible (e.g., an enhancement) with the second iteration of the first technology resource component, the system may implement the second iteration of the first technology resource component.

In some embodiments, evaluating, via the dynamic evaluation template algorithm module application 250, iterations of the first technology resource component further comprises identifying a first modification to a first technology element of the first iteration of the first technology resource component in the second iteration of the first technology resource component that succeeds the first iteration. Here, the dynamic evaluation template algorithm module application 250 may analyze the transformed first testing output with the transformed second testing output to determine whether the first modification is (i) an error, and/or (ii) incompatible with the second iteration of the first technology resource component. In response to determining that the first modification is (i) an error, and/or (ii) incompatible with the second iteration of the first technology resource component, the system may block implementation of the second iteration of the first technology resource component.

Subsequently, the analysis event data generation component application 244 may construct analysis event data 240 associated with the evaluation of the first iteration and the second iteration of the first technology resource component, as indicated by block 425. The analysis event data generation component application 244 may then transmit the analysis event data to a technology system 106 associated with implementing the first technology resource component, as indicated by block 430. The system, via the analysis event data generation component 244, constructs the evaluated results as analysis event data 240 and generates a report. The analysis event data 240 may be displayed on a dashboard GUI on the user device for further analysis by users/individuals.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for dynamic analysis and detection of transformed transient data in a distributed system network, wherein the system is structured for validating, determining and evaluating temporal data transformations associated with technology resource components across iterations of technology applications for maintaining backward compatibility, the system comprising:
  an execution module structured for executing technology resource components in a plurality of testing technology environments concurrently;
  an analysis module structured for transforming outputs of executing technology resource components and determining deployed changes in iterations of the technology resource components;
  at least one memory device with computer-readable program code stored thereon;
  at least one communication device;
  at least one processing device operatively coupled to the execution module and the analysis module, the at least one memory device and the at least one communication device, wherein executing the computer-readable code is configured to cause the at least one processing device to:
    receive, at a request processing module application, one or more technology resource requests associated with analysis of iterations of technology resource components;
    determine, for a first technology resource request of the one or more technology resource requests, an associated first technology resource component;
    determine a plurality of system integration testing environments associated with the first technology resource component, wherein the plurality of system integration testing environments comprise (i) a first technology environment associated with a first iteration of the first technology resource component, and (ii) a second technology environment associated with a second iteration of the first technology resource component that succeeds the first iteration;
    execute, via a parallel processing component application, the first technology resource component, parallelly, in (i) the first technology environment and (ii) the second technology environment such that executing the first technology resource component provides a first testing output at the first technology environment and a second testing output at the second technology environment;
    transform the first testing output associated with executing the first technology resource component in the first technology environment into a first key-value pair structure;
    transform the second testing output associated with executing the first technology resource component in the second technology environment into a second key-value pair structure;
    evaluate, via a dynamic evaluation template algorithm module application, iterations of the first technology resource component by comparing the transformed first testing output with the transformed second testing output to determine modifications to the first iteration of the first technology resource component in the second iteration of the first technology resource component that succeeds the first iteration;
    construct, via an analysis event data generation component application, analysis event data associated with the evaluation of the first iteration and the second iteration of the first technology resource component; and
    transmit the analysis event data to a technology system associated with implementing the first technology resource component.

2. The system of claim 1, wherein the one or more technology resource request comprise a plurality of technology resource requests, wherein executing the computer-readable code is configured to further cause the at least one processing device to:
  determine, for each of the plurality of technology resource requests, a resource request structure type; wherein the resource request structure type comprises batch process requests, web service requests, technology application requests and request suites;
  separate one or more first technology resource requests from the plurality of technology resource requests based on determining that the one or more first technology resource requests are associated with a first resource request type; and
  decouple the one or more first technology resource requests of the first resource request type, such that each of the one or more first technology resource requests can be processed independently from one another at the parallel processing component application.

3. The system of claim 1, wherein executing the computer-readable code is configured to further cause the at least one processing device to:

authenticate, via a properties file externalization application, each of the one or more technology resource requests;

initialize, via a properties file externalization application, each of the one or more technology resource requests, wherein initializing the one or more technology resource requests comprises determining technology attributes associated with each of the one or more technology resource requests, wherein the technology attributes comprise security certificates, entity host data, technology environment data, and/or technology resource component data; and construct, for each of the one or more technology resource requests, a formatted service request comprising technology resource component ID, technology resource component name, technology resource component URL, header parameters, authentication token, technology resource component type and/or session ID, based on initializing the one or more technology resource requests.

4. The system of claim 1, wherein executing the computer-readable code is configured to further cause the at least one processing device to:

transmit, from the parallel processing component application, the first testing output and the second testing output to a structured template engine application;

determine, for each of the first testing output and the second testing output associated with executing the first technology resource component parallelly, in the first technology environment and the second technology environment, an output type;

format, each of the first testing output and the second testing output, such that the first testing output and the second testing output comprise output parameters comprising a request ID, technology resource component name, first technology environment data, second technology environment data, output type, technology resource component type and/or session ID; and store, via the structured template engine application, each of the first testing output and the second testing output associated with executing the first technology resource component parallelly, in the first technology environment and the second technology environment, at a structured output database.

5. The system of claim 4, wherein executing the computer-readable code is configured to further cause the at least one processing device to: retrieve, via a response evaluation component application, the stored first testing output and the second testing output from the structured output database, wherein retrieving comprises determining a session ID associated with each of the first testing output and the second testing output stored at the structured output database.

6. The system of claim 1, wherein transforming the first testing output into the first key-value pair structure comprises mapping one or more technology elements of the first technology resource component of the first testing output onto one or more first key-value pairs; and wherein transforming the second testing output into the second key-value pair structure comprises mapping one or more technology elements of the first technology resource component of the second testing output onto one or more second key-value pairs.

7. The system of claim 1, wherein determining modifications to the first iteration of the first technology resource component in the second iteration of the first technology resource component that succeeds the first iteration comprises determining (i) addition of new technology elements in the second iteration of the first technology resource component, (ii) removal of one or more technology elements of the first iteration in the second iteration of the first technology resource component, and/or (iii) alteration of one or more technology elements of the first iteration in the second iteration of the first technology resource component.

8. The system of claim 1, wherein evaluating, via the dynamic evaluation template algorithm module application, iterations of the first technology resource component further comprises:

identifying a first modification to a first technology element of the first iteration of the first technology resource component in the second iteration of the first technology resource component that succeeds the first iteration;

analyzing the transformed first testing output with the transformed second testing output to determine whether the first modification is compatible with the second iteration of the first technology resource component; and in response to determining that the first modification is compatible with the second iteration of the first technology resource component, implementing the second iteration of the first technology resource component.

9. The system of claim 1, wherein evaluating, via the dynamic evaluation template algorithm module application, iterations of the first technology resource component further comprises:

identifying a first modification to a first technology element of the first iteration of the first technology resource component in the second iteration of the first technology resource component that succeeds the first iteration;

analyzing the transformed first testing output with the transformed second testing output to determine whether the first modification is (i) an error, and/or (ii) incompatible with the second iteration of the first technology resource component; and in response to determining that the first modification is (i) an error, and/or (ii) incompatible with the second iteration of the first technology resource component, blocking implementation of the second iteration of the first technology resource component.

10. A computer program product for dynamic analysis and detection of transformed transient data in a distributed system network, wherein the computer program product is structured for validating, determining and evaluating temporal data transformations associated with technology resource components across iterations of technology applications for maintaining backward compatibility, the computer program product comprising a non-transitory computer-readable storage medium having computer-executable instructions to:

receive, at a request processing module application, one or more technology resource requests associated with analysis of iterations of technology resource components;

determine, for a first technology resource request of the one or more technology resource requests, an associated first technology resource component;

determine a plurality of system integration testing environments associated with the first technology resource component, wherein the plurality of system integration testing environments comprise (i) a first technology environment associated with a first iteration of the first technology resource component, and (ii) a second technology environment associated with a second iteration of the first technology resource component that succeeds the first iteration;

execute, via a parallel processing component application, the first technology resource component, parallelly, in (i) the first technology environment and (ii) the second technology environment such that executing the first technology resource component provides a first testing output at the first technology environment and a second testing output at the second technology environment;

transform the first testing output associated with executing the first technology resource component in the first technology environment into a first key-value pair structure;

transform the second testing output associated with executing the first technology resource component in the second technology environment into a second key-value pair structure;

evaluate, via a dynamic evaluation template algorithm module application, iterations of the first technology resource component by comparing the transformed first testing output with the transformed second testing output to determine modifications to the first iteration of the first technology resource component in the second iteration of the first technology resource component that succeeds the first iteration;

construct, via an analysis event data generation component application, analysis event data associated with the evaluation of the first iteration and the second iteration of the first technology resource component; and transmit the analysis event data to a technology system associated with implementing the first technology resource component.

11. The computer program product of claim 10, wherein the non-transitory computer-readable storage medium further comprises computer-executable instructions to:

authenticate, via a properties file externalization application, each of the one or more technology resource requests;

initialize, via a properties file externalization application, each of the one or more technology resource requests, wherein initializing the one or more technology resource requests comprises determining technology attributes associated with each of the one or more technology resource requests, wherein the technology attributes comprise security certificates, entity host data, technology environment data, and/or technology resource component data; and construct, for each of the one or more technology resource requests, a formatted service request comprising technology resource component ID, technology resource component name, technology resource component URL, header parameters, authentication token, technology resource component type and/or session ID, based on initializing the one or more technology resource requests.

12. The computer program product of claim 10, wherein transforming the first testing output into the first key-value pair structure comprises mapping one or more technology elements of the first technology resource component of the first testing output onto one or more first key-value pairs; and wherein transforming the second testing output into the second key-value pair structure comprises mapping one or more technology elements of the first technology resource component of the second testing output onto one or more second key-value pairs.

13. The computer program product of claim 10, wherein determining modifications to the first iteration of the first technology resource component in the second iteration of the first technology resource component that succeeds the first iteration comprises determining (i) addition of new technology elements in the second iteration of the first technology resource component, (ii) removal of one or more technology elements of the first iteration in the second iteration of the first technology resource component, and/or (iii) alteration of one or more technology elements of the first iteration in the second iteration of the first technology resource component.

14. The computer program product of claim 10, wherein evaluating, via the dynamic evaluation template algorithm module application, iterations of the first technology resource component further comprises:

identifying a first modification to a first technology element of the first iteration of the first technology resource component in the second iteration of the first technology resource component that succeeds the first iteration;

analyzing the transformed first testing output with the transformed second testing output to determine whether the first modification is compatible with the second iteration of the first technology resource component; and in response to determining that the first modification is compatible with the second iteration of the first technology resource component, implementing the second iteration of the first technology resource component.

15. The computer program product of claim 10, wherein evaluating, via the dynamic evaluation template algorithm module application, iterations of the first technology resource component further comprises:

identifying a first modification to a first technology element of the first iteration of the first technology resource component in the second iteration of the first technology resource component that succeeds the first iteration;

analyzing the transformed first testing output with the transformed second testing output to determine whether the first modification is (i) an error, and/or (ii) incompatible with the second iteration of the first technology resource component; and in response to determining that the first modification is (i) an error, and/or (ii) incompatible with the second iteration of the first technology resource component, blocking implementation of the second iteration of the first technology resource component.

16. A computer implemented method for dynamic analysis and detection of transformed transient data in a distributed system network, wherein the computer implemented method is structured for validating, determining and evaluating temporal data transformations associated with technology resource components across iterations of technology applications for maintaining backward compatibility, the computer implemented method comprising:

receiving, at a request processing module application, one or more technology resource requests associated with analysis of iterations of technology resource components;

determining, for a first technology resource request of the one or more technology resource requests, an associated first technology resource component;

determining a plurality of system integration testing environments associated with the first technology resource component, wherein the plurality of system integration testing environments comprise (i) a first technology environment associated with a first iteration of the first technology resource component, and (ii) a second technology environment associated with a second iteration of the first technology resource component that succeeds the first iteration;

executing, via a parallel processing component application, the first technology resource component, parallelly, in (i) the first technology environment and (ii) the second technology environment such that executing the first technology resource component provides a first testing output at the first technology environment and a second testing output at the second technology environment;

transforming the first testing output associated with executing the first technology resource component in the first technology environment into a first key-value pair structure;

transforming the second testing output associated with executing the first technology resource component in the second technology environment into a second key-value pair structure;

evaluating, via a dynamic evaluation template algorithm module application, iterations of the first technology resource component by comparing the transformed first testing output with the transformed second testing output to determine modifications to the first iteration of the first technology resource component in the second iteration of the first technology resource component that succeeds the first iteration;

constructing, via an analysis event data generation component application, analysis event data associated with the evaluation of the first iteration and the second iteration of the first technology resource component; and transmitting the analysis event data to a technology system associated with implementing the first technology resource component.

17. The computer implemented method of claim 16, wherein transforming the first testing output into the first key-value pair structure comprises mapping one or more technology elements of the first technology resource component of the first testing output onto one or more first key-value pairs; and wherein transforming the second testing output into the second key-value pair structure comprises mapping one or more technology elements of the first technology resource component of the second testing output onto one or more second key-value pairs.

18. The computer implemented method of claim 16, wherein determining modifications to the first iteration of the first technology resource component in the second iteration of the first technology resource component that succeeds the first iteration comprises determining (i) addition of new technology elements in the second iteration of the first technology resource component, (ii) removal of one or more technology elements of the first iteration in the second iteration of the first technology resource component, and/or (iii) alteration of one or more technology elements of the first iteration in the second iteration of the first technology resource component.

19. The computer implemented method of claim 16, wherein evaluating, via the dynamic evaluation template algorithm module application, iterations of the first technology resource component further comprises:

identifying a first modification to a first technology element of the first iteration of the first technology resource component in the second iteration of the first technology resource component that succeeds the first iteration;

analyzing the transformed first testing output with the transformed second testing output to determine whether the first modification is compatible (enhancement) with the second iteration of the first technology resource component; and in response to determining that the first modification is compatible (enhancement) with the second iteration of the first technology resource component, implementing the second iteration of the first technology resource component.

20. The computer implemented method of claim 16, wherein evaluating, via the dynamic evaluation template algorithm module application, iterations of the first technology resource component further comprises:

identifying a first modification to a first technology element of the first iteration of the first technology resource component in the second iteration of the first technology resource component that succeeds the first iteration;

analyzing the transformed first testing output with the transformed second testing output to determine whether the first modification is (i) an error, and/or (ii) incompatible with the second iteration of the first technology resource component; and in response to determining that the first modification is (i) an error, and/or (ii) incompatible with the second iteration of the first technology resource component, blocking implementation of the second iteration of the first technology resource component.

* * * * *